Dec. 16, 1952     B. G. STÅLHEIM     2,621,646
SAW BLADE ATTACHMENT IN STONE SAWING MACHINE
Filed Dec. 9, 1950
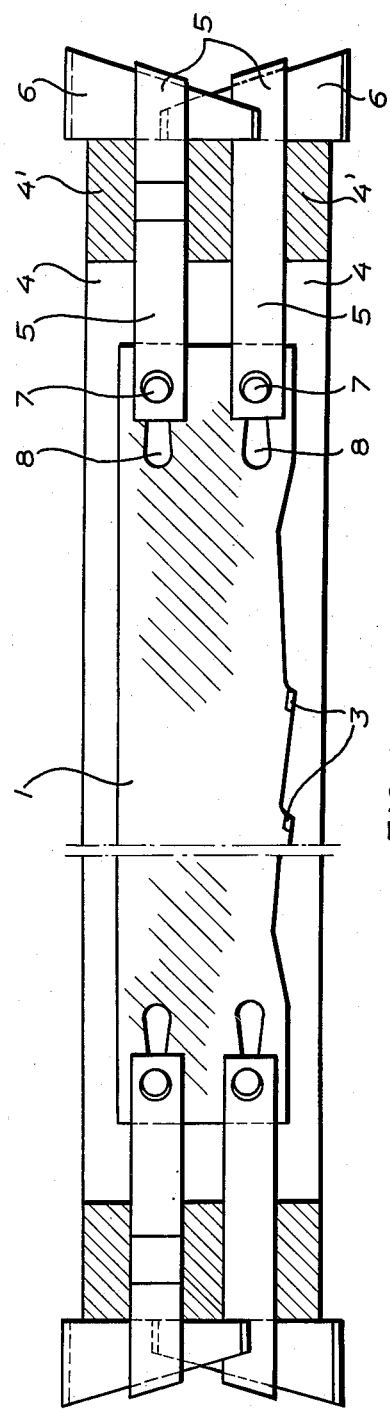
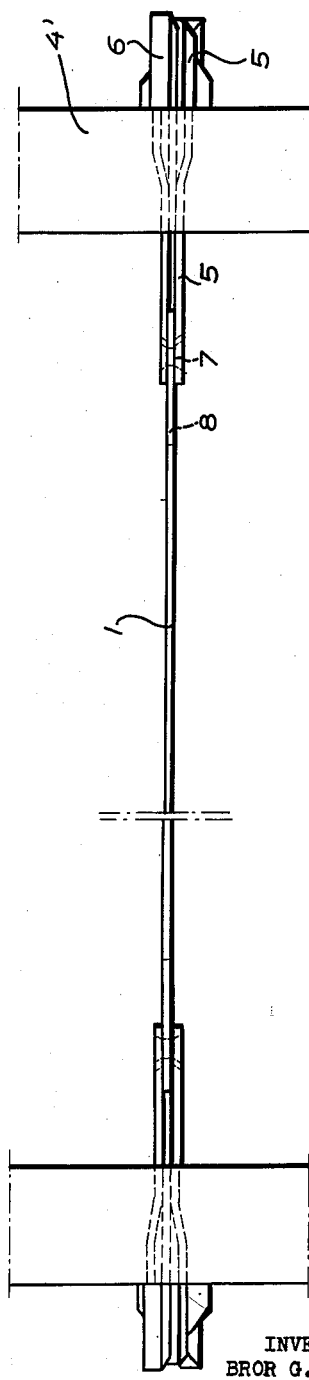
INVENTOR:
BROR G. STÅLHEIM
By
Attorney Patented Dec. 16, 1952

2,621,646

UNITED STATES PATENT OFFICE 2,621,646

SAW BLADE ATTACHMENT IN STONE SAWING MACHINE

Bror G. Stålheim, Stockholm, Sweden

Application December 9, 1950, Serial No. 199,954
In Sweden September 15, 1950

4 Claims. (Cl. 125—17)

This invention relates to a saw blade attachment in stone sawing machines and more particularly to a saw blade attachment in such stone sawing machine in which a gang of parallel longitudinal saw blades are stretched in a saw sash which reciprocates over the stone or marble block to be sawn.

In the stone sawing art there has lately occurred a considerable increase in the capacity of such stone sawing machines, which are provided with a saw sash and a plurality of saw blades stretched or strained therein, and this increase is substantially due to the use of toothed saw blades wherein the teeth are made of a particularly hard and wear resistant material such as hard metal, cemented carbides, diamonds or the like, whereby it is possible to considerably increase the sawing speed, i. e. the speed at which the stone block is fed towards the saw blades or vice versa, and thus to cut down the time necessary for sawing through a certain stone block.

However, this increase in the sawing speed has made it very difficult to obtain straight cuts in the block under the heavy stresses which are prevailing.

This invention has for its object to solve said problem and this is achieved by individually stretching or straining both longitudinal edges of each saw blade, i. e. the cutting edge as well as the back edge thereof, so that the cutting edge may be given a greater stress than the back edge. This procedure considerably improves the result of sawing, particularly when saw blades are used the cutting edges of which consist of another stronger or thicker material than the back edges, as is often the case in toothed saw blades where the teeth are soldered or otherwise secured to a steel blade body and where said body thus has to form a steady support or backing for the teeth; however the procedure is also useful in other cases.

A saw blade attachment according to the invention is illustrated by way of example in the accompanying drawings without limiting the invention to the details given therein since equivalent means may be substituted.

Referring now to the drawings,

Fig. 1 is a longitudinal section through a saw sash with saw blades stretched or strained therein, while Fig. 2 shows a partial horizontal view of the saw sash in Fig. 1, a plurality of similar saw blades being of course mounted in parallel in the sash.

According to the invention each saw blade 1, which is provided with raked hard metal teeth 3 along its cutting edge 2, is stretched or strained in the saw sash 4 by means of two separate yokes 5 at each end thereof. The transverse sides of the saw sash 4 are formed by three or more sash beams 4' arranged one above the other, between which the yokes 5 are inserted at different levels and clamped or keyed in a known manner by mutually independent clamping means, here shown as wedge 6. To prevent the wedges 6 from barring each other on the outside of the sash beams 4', the yokes 5 being located in a line, one straight above the other, the yokes 5 are preferably turned some degrees about their longitudinal axis, so that the wedges 6 will not be at right angles to the sash beams 4'.

It is obvious that the ends of the yokes 5, between which the saw blades are stretched, must lie in one and the same plane, so that no breaking stresses occur in the saw blades.

To render uniform the strain or stress in the saw blade effected by means of the yokes 5, each yoke 5 is pivotally connected to the saw blade 1. For this reason, each yoke 5 is forked at its inner end and in each shank thereof is provided with an inwardly tapering hole, the holes in both shanks of each yoke being adapted to receive and seat a double-conical cone shaped link member 7 having a thin center portion, the larger end diameter of the member 7 being slightly smaller than the smallest diameter of each hole, so that the body may be easily inserted or removed. The body 7 transverses the shanks of the yoke 5 as well as the saw blade when the latter is mounted, the latter being, of course provided with a corresponding hole. However, such an arrangement with a simply round hole in the saw blade does not allow an individual exchange of the yokes 5 if the saw blades are located close to one another in the saw sash 4. Therefore, the holes 8 in the saw blades are in this case given a elongate shape in the longitudinal direction of the saw blades, the slots, thus formed, also increasing in width from the blade end towards the blade centre or middle. Now, the width of each slot is so chosen that nearest to the blade end it is less than the largest end diameter of the body 7, while nearer to the centre or middle of the blade it is larger than said diameter. Thus the body 7 may easily be inserted through the holes in the shanks of the yoke 5 and through the saw blade hole or slot 8 when the yoke 5 is pushed in towards the blade centre or middle of the saw blade and the wider portion of said slot, whereas the body 7 is wedged and impossible to remove when the yoke 5 is pulled outwardly and strain is effected by means of the wedge 6 in each hanging.

Of course, I do not wish to limit myself to the form of the invention herein shown and described. To those skilled in the art it will be clear that other known means than wedges 6, e. g., strain screws, may be used to strain the yokes and the saw blade, and that more than three transverse beams 4' or even another arrangement than these beams may be used in the saw sash to provide an individual support for each of the yokes for the saw blade, so that it is possible by means of said yokes to effect individual strain or stress in the saw blade near the cutting edge or near the back edge thereof. It will also be clear that the shape, size and arrangement of the hangings may be varied within wide limits to suit the saw blade in each particular case.

I claim:

1. In a stone sawing machine; the combination of a saw sash, a gang of longitudinal saw blades stretched therein, each of said saw blades having two spaced holes adjacent each end of the blade and near each longitudinal edge thereof, said holes being elongated and extending longitudinally of the saw blade, the width of each hole increasing towards the longitudinal center of the saw blade, a yoke member associated with each of said holes, a connecting pin tapering towards the axial center thereof and passing through each hole and forked ends of the related yoke for pivotally connecting the latter to the adjacent end of the saw blade, and tensioning means for individually connecting each of said yokes to said saw sash.

2. In a stone sawing machine; the combination of a saw sash, a gang of longitudinal saw blades in said sash, each of said blades having at least one longitudinal slot formed adjacent each of the opposite ends thereof and decreasing in width in the direction toward the adjacent end of the blade, a yoke member for each slot having forked end portions extending on opposite sides of the related end portion of the blade and formed with registered transverse apertures, a pivot pin for pivotally connecting said forked end portions to the blade and tapering towards the axial center thereof, the end diameters of said pin being smaller than the largest width of said slot and larger than the smallest width of said slot, said pin being axially movable through said apertures of the forked end portions, and means for individually mounting each yoke on the saw sash and for displacing the related yoke longitudinally to tension the blade connected thereto.

3. In a stone sawing machine; the combination set forth in claim 2; wherein said sash includes end members having openings extending therethrough to receive said yokes; and wherein the last mentioned means includes a wedge member for each yoke adapted to slidably engage in the latter and bear against the outer face of the adjacent end member of the sash.

4. In a stone sawing machine; the combination of a saw sash including three transverse, superposed and spaced apart beams at each end thereof, a gang of longitudinal saw blades stretched in said sash, each of said saw blades having two elongated, longitudinally extending, slots formed in each end portion thereof adjacent the opposite longitudinal edges of each blade, each of said slots tapering in the direction toward the adjacent end of the related blade, forked members embracing the ends of each of said saw blades and extending longitudinally between adjacent ones of said spaced beams of said sash, tensioning means including a wedge member formed to extend through the outer end of each forked member and bear against the outer faces of said beams for connecting said forked members on said saw sash, said forked members having apertures for registration with said slots of the related saw blades, and connecting pins extending loosely through said apertures and each adapted to be wedged in the related tapering slot when the associated forked member is tensioned in the direction toward the adjacent end of the saw blade to then prevent transverse removal of said connecting pin from said slot and apertures.

BROR GUSTAF STÅLHEIM.

REFERENCES CITED

The following references are of record in the file of this patent:

UNITED STATES PATENTS

| Number | Name | Date |
|---|---|---|
| 108,228 | Young et al. | Oct. 11, 1870 |
| 173,709 | Young et al. | Feb. 15, 1876 |
| 361,033 | Walter | Apr. 12, 1887 |
| 417,404 | Clmenson | Dec. 17, 1889 |
| 526,477 | Young | Sept. 25, 1894 |
| 568,731 | Belhen | Oct. 6, 1896 |
| 632,000 | Setteworth | Aug. 29, 1899 |
| 670,219 | Bell | Mar. 19, 1901 |

FOREIGN PATENTS

| Number | Country | Date |
|---|---|---|
| 46,164 | Norway | Nov. 11, 1927 |
| 551,592 | Germany | Feb. 16, 1930 |